Oct. 30, 1951

C. I. BOHLEN 2,573,177

METHOD OF MAKING VALVES

Filed May 23, 1945

WITNESS:
Robt. M. Kitchel.

INVENTOR
Charles I. Bohlen
BY
Burns & Harding
ATTORNEYS.

Patented Oct. 30, 1951

2,573,177

UNITED STATES PATENT OFFICE 2,573,177

METHOD OF MAKING VALVES

Charles I. Bohlen, Doylestown, Pa., assignor to Hose Accessories Company, Philadelphia, Pa., a corporation of Pennsylvania Application May 23, 1945, Serial No. 595,366

1 Claim. (Cl. 29—157.1)

This invention relates to an improvement in a method of making valves, and more specifically to valves having a through port, such as plug valves and shut-off cocks.

One of the objects of my invention is to provide a valve structure in which the valve proper is in the form of a ball having a through port, and which is adapted and positioned to float between two diaphragms which form oppositely disposed seats for the valve.

Another object of my invention is to provide a valve structure in which the pressure of the seats or diaphragms on the floating ball valve can be preloaded to a predetermined degree to maintain tight joints for the pressure conditions under which the valve structure is to be subjected.

Another object of my invention is to provide a valve structure in which the ball valve not only floats between the diaphragms, but is also provided with a floating connection with its operating stem.

A still further object of my invention is to provide a valve structure, in which the casing may be formed of two parts which are duplicates and may be formed in the same dies.

A still further object of my invention is to provide a valve structure in which the diaphragms or valve seats are also duplicates, so they may be formed from the same dies, and at the same time the diaphragms may be seated in their respective casing members by the same dies.

A still further object of my invention is to provide stops within the casing for the fully open as well as the completely closed position of the valve.

A further object of my invention is to provide a structure in which all danger of leakage along the operating stem is avoided, when the valve is fully opened, or completely closed.

Referring to the accompanying drawings in which I have illustrated one form of my invention, in which.

Figure 1:
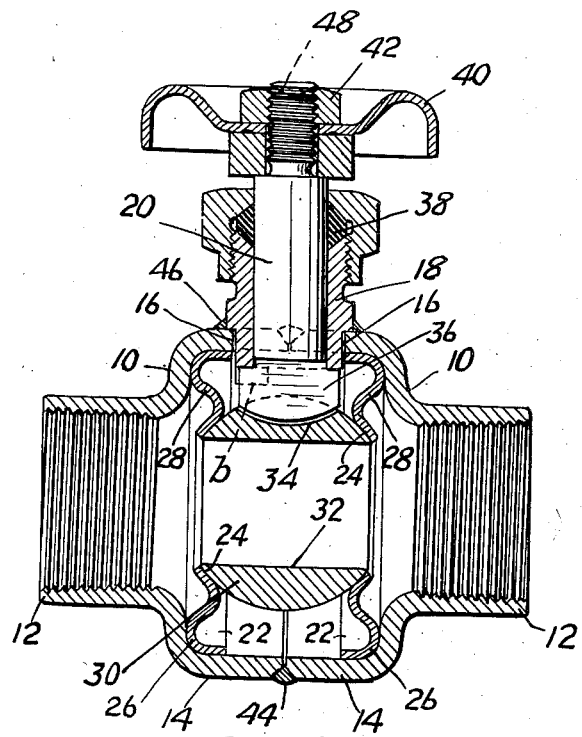
Fig. 1 is a longitudinal section through the valve structure.
Figure 2:
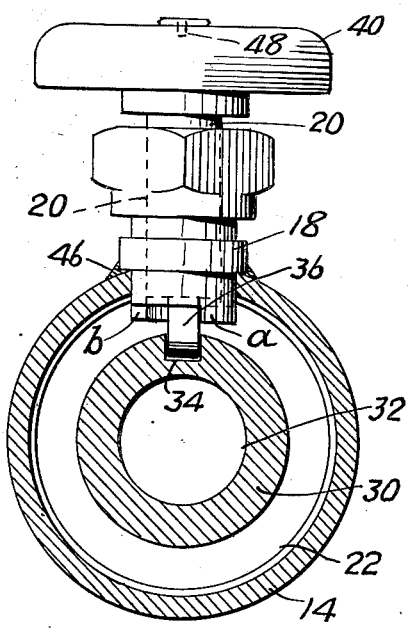
Fig. 2 is a transverse sectional view of the same.

The shell or casing of the valve structure is formed of two identical shell members 10, 10 each being provided with a threaded end 12, and a cupped portion 14, for purpose hereinafter described.

Each shell member 10 is provided with a semi-circular recess at 16, surrounding the reduced lower end of a guide sleeve 18, for the valve operating stem 20, hereinafter described.

In the form shown the shell members are formed of drawn steel, but may be formed of cast metals, in which case the interior of the cups should be machined.

Seated in cupped portion 14 of each member 10 is a diaphragm 22 which is provided with a valve seat 24, and a curved annular flange 26, which has been pressed into the cupped portion 14 of the shell to form a tight joint between the shell and diaphragm 22.

The curved intermediate portion 28 of each diaphragm 22, between the seat forming portions 24 and the curved annular flange 26, acts as a pressure spring to hold the seats in sealing contact with a ball valve 30, which is suspended or held in a floating position between the two diaphragms.

The diaphragms 22 are preferably formed of stainless steel, Monel metal, or other non-corrosive material having sufficient elasticity to retain the seats 24 in contact with the valve 30.

The valve 30, which is preferably formed of non-ferrous metal, is of spherical shape, and is provided with a through port 32, and a key groove or slot 34, in which is seated a key member 36 on the end of the operating stem 20, hereinbefore mentioned.

It will be noted that there is considerable clearance in all directions between the key 36 and the slot 34, so that the valve 30 is freely floated between the diaphragms 22, so that the diaphragms are not subjected to any strain through the medium of the valve and stem if the parts are not in perfect alignment, which might occur if the stem and valve were rigidly connected to each other.

The guide sleeve 18 for the stem 20 is provided with the usual packer gland as indicated at 38. The valve illustrated shows a shut-off cock type of valve similar to the usual type of plug valve. It should be noted that the fluid under pressure in the lines may be shut off completely by the positive sealing action of the ball seats, and also fully opened to provide free unobstructed flow of the said fluid through the valve, without depending on any type of sealing means to prevent leakage around the stem. This valve is not intended to be a regulating valve as such, since the fluid does enter the casing when the valve is partially opened. However the packing gland around the stem has been incorporated to take care of any leakage when this condition prevails, and the valve may be used as a flow regulator for all practical purposes.

Connected to the upper end of the operating stem 20 is the usual operating handle 40, which is held in position by the usual lock nut 42.

Figure 3:
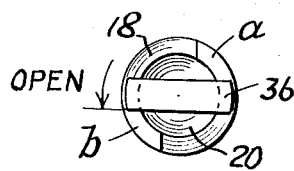
Fig. 3 is an end view of the valve operating stem key, and its supporting sleeve showing the stem in the position when the valve is open.
Figure 4:
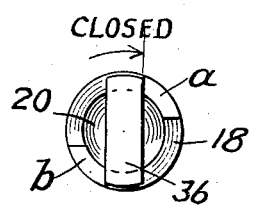
Fig. 4 is a view similar to Fig. 3 showing the closed position of the operating stem.

The lower end of the operating stem guide sleeve 18 is provided with stop lugs $a$ and $b$ for the key 36, which are so positioned that the valve 30 may be turned about 90° from its full open to its full closed position, as shown in Figs. 3 and 4, respectively.

The upper end of the operating stem 20 is provided with a slot 48, parallel with port 30, indicating the position of the valve.

In the assembly of the parts the diaphragms 22 are pressed into the shells 10, to form tight joints between the shells and diaphragms, and a pair of shells may then be positioned in the fixed portion and the movable ram of a press with the cupped ends facing each other and with the semi-circular recesses 16, in substantial alignment with each other, and a ball 30 loosely supported between the diaphragms.

The assembled operating stem 20 and its guide sleeve 18 are then dropped into position with the key 36, in the slot 34 in the valve. The predetermined degree of pressure is then applied to the press, to properly tension the elastic portions 28 of the diaphragms, and are then held under this pressure during the welding at points 44 and 46, or if desired the shells may be welded to each other before the assembled operating stem is positioned and welded in place.

It will be noted that the shells have not been brought into contact with each other or with the sleeve 18, so that the maximum tension has not been applied to the diaphragms, in the form illustrated.

It will also be appreciated that the degree of elasticity may be varied in the diaphragms by varying the gauge of the stock from which the diaphragms are made.

It will also be understood that the shell members may be secured to each other by means other than welding, as the shells may be provided with separated flanges secured to each other by screws, which would also permit the adjusting of the pressure of the valve seats against the valve.

If desired gaskets may be placed between the diaphragms and the shells to form a tight joint, but it is preferred to form a tight joint by pressing the diaphragms into the shells.

It will be appreciated that the foregoing description of embodiments of this invention is for illustrative purposes and is not intended to be in limitation of the scope of the invention or of the claim appended hereto.

What I claim and desire to protect by Letters Patent is:

The method of forming a valve structure, having a ball valve with a through port suspended between seats on oppositely disposed resilient sheet material diaphragms under a predetermined pressure, comprising the steps of assembling preformed diaphragms in shells, placing a valve between the diaphragms in opposing shells in relation to the seats, moving the shells towards each other and placing the diaphragms under a predetermined pressure, and then welding the shells to each other to form the body of the valve while maintaining that spacing between the opposing shells which will retain the predetermined pressure between the valve member and the diaphragms.

CHARLES I. BOHLEN.

REFERENCES CITED

The following references are of record in the file of this patent:

UNITED STATES PATENTS

| Number | Name | Date |
|---|---|---|
| 1,043,065 | Cash | Nov. 5, 1912 |
| 2,191,232 | Heinen | Feb. 20, 1940 |
| 2,201,895 | Glen | May 21, 1940 |

FOREIGN PATENTS

| Number | Country | Date |
|---|---|---|
| 28,193 | Great Britain | of 1909 |
| 846,760 | France | of 1939 |